(12) United States Patent
Ludwig

(10) Patent No.: US 10,037,186 B2
(45) Date of Patent: *Jul. 31, 2018

(54) MULTI-CHANNEL DATA SONIFICATION EMPLOYING DATA-MODULATED SOUND TIMBRE CLASSES

(71) Applicant: NRI R&D PATENT LICENSING, LLC, San Antonio, TX (US)

(72) Inventor: Lester F. Ludwig, San Antonio, TX (US)

(73) Assignee: NRI R&D PATENT LICENSING, LLC, San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/585,702

(22) Filed: May 3, 2017

(65) Prior Publication Data

US 2017/0235548 A1     Aug. 17, 2017

Related U.S. Application Data

(63) Continuation of application No. 14/176,000, filed on Feb. 7, 2014, now Pat. No. 9,646,589, which is a continuation of application No. 13/846,843, filed on Mar. 18, 2013, now Pat. No. 8,692,100, which is a continuation of application No. 13/450,350, filed on Apr. 18, 2012, now Pat. No. 8,440,902, which is a continuation of application No. 12/817,196, filed on Jun. 17, 2010, now Pat. No. 8,247,677.

(51) Int. Cl.
*G10H 1/06*     (2006.01)
*G06F 3/16*     (2006.01)

(52) U.S. Cl.
CPC ............. *G06F 3/167* (2013.01); *G10H 1/06* (2013.01); *G10H 2210/301* (2013.01); *G10H 2220/351* (2013.01); *G10H 2250/471* (2013.01)

(58) Field of Classification Search
CPC ............. G10H 1/06; G10H 2250/471; G10H 2210/301; G10H 2220/351; G06F 3/167
USPC .......... 84/600–602, 609, 649, 622, 623, 659
See application file for complete search history.

(56) References Cited

U.S. PATENT DOCUMENTS

| | | | | |
|---|---|---|---|---|
| 4,504,933 A | * | 3/1985 | Janney | G08B 3/10 340/815.69 |
| 4,576,178 A | * | 3/1986 | Johnson | F02P 17/10 324/140 R |
| 4,653,498 A | * | 3/1987 | New, Jr. | A61B 5/14551 600/324 |
| 4,785,280 A | * | 11/1988 | Fubini | B60C 23/0401 340/328 |

(Continued)

*Primary Examiner* — David Warren
(74) *Attorney, Agent, or Firm* — Procopio, Cory, Hargreaves & Savitch LLP

(57) ABSTRACT

Multichannel data sonification arrangements for providing parallel perceptual channels for representing complex numerical data to a user seeking to identify correlations within the data are presented. In an implementation, several varying data quantities are represented by time-varying sound and presented to a user to observe both variations and correlations among sonic events or trends. The data sonification can include multiple data-modulated sound timbre classes, for example each separately rendered within a stereo sound field. The sound timbre classes can be arranged to convey a sonic metaphor.

20 Claims, 9 Drawing Sheets

(56) References Cited

U.S. PATENT DOCUMENTS

| | | | | |
|---|---|---|---|---|
| 4,812,746 A * | 3/1989 | Dallas, Jr. | | A61F 9/08 |
| | | | | 324/111 |
| 4,996,409 A * | 2/1991 | Paton | | B23K 9/0953 |
| | | | | 219/130.01 |
| 5,095,896 A * | 3/1992 | Omoigui | | A61M 16/04 |
| | | | | 128/200.26 |
| 5,285,521 A * | 2/1994 | Holt | | G01N 29/0609 |
| | | | | 704/270 |
| 5,293,385 A * | 3/1994 | Hary | | G06F 3/16 |
| | | | | 714/38.13 |
| 5,360,005 A * | 11/1994 | Wilk | | A61B 8/00 |
| | | | | 600/437 |
| 5,371,854 A * | 12/1994 | Kramer | | G07C 3/00 |
| | | | | 704/258 |
| 5,508,473 A * | 4/1996 | Chafe | | G10H 5/007 |
| | | | | 84/659 |
| 5,537,641 A * | 7/1996 | da Vitoria Lobo | | G06T 13/60 |
| | | | | 345/419 |
| 5,606,144 A * | 2/1997 | Dabby | | G10H 1/0025 |
| | | | | 84/609 |
| 5,675,708 A * | 10/1997 | Fitzpatrick | | G06F 17/30569 |
| | | | | 704/200 |
| 5,730,140 A * | 3/1998 | Fitch | | A61B 5/0205 |
| | | | | 600/514 |
| 5,798,923 A * | 8/1998 | Laskowski | | G06T 17/05 |
| | | | | 345/418 |
| 5,801,969 A * | 9/1998 | Nagahama | | G06F 17/13 |
| | | | | 703/9 |
| 5,836,302 A * | 11/1998 | Homuth | | A61M 16/0051 |
| | | | | 116/142 FP |
| 5,923,329 A * | 7/1999 | Beale | | G06T 17/20 |
| | | | | 345/418 |
| 6,000,833 A * | 12/1999 | Gershenfeld | | G10H 5/007 |
| | | | | 703/2 |
| 6,009,394 A * | 12/1999 | Bargar | | G06F 3/011 |
| | | | | 381/17 |
| 6,054,646 A * | 4/2000 | Pal | | G10H 1/125 |
| | | | | 84/608 |
| 6,083,163 A * | 7/2000 | Wegner | | B25J 9/1679 |
| | | | | 600/429 |
| 6,088,675 A * | 7/2000 | MacKenty | | G10L 13/027 |
| | | | | 704/260 |
| 6,137,045 A * | 10/2000 | Short | | G10H 7/002 |
| | | | | 84/603 |
| 6,243,663 B1 * | 6/2001 | Baty | | G05B 17/02 |
| | | | | 703/2 |
| 6,283,763 B1 * | 9/2001 | Matsuzaki | | G09B 23/286 |
| | | | | 434/262 |
| 6,296,489 B1 * | 10/2001 | Blass | | G09B 19/04 |
| | | | | 434/185 |
| 6,356,860 B1 * | 3/2002 | Barnette | | G06F 17/5018 |
| | | | | 703/1 |
| 6,442,523 B1 * | 8/2002 | Siegel | | G06F 17/30017 |
| | | | | 434/169 |
| 6,449,501 B1 * | 9/2002 | Reuss | | A61B 5/14551 |
| | | | | 600/322 |
| 6,505,147 B1 * | 1/2003 | Kumashiro | | G06F 17/5018 |
| | | | | 700/121 |
| 6,516,292 B2 * | 2/2003 | Yahalom | | G06F 17/10 |
| | | | | 345/419 |
| 7,138,575 B2 * | 11/2006 | Childs, Jr. | | G06Q 40/00 |
| | | | | 700/94 |
| 2002/0002458 A1 * | 1/2002 | Owen | | G10L 13/027 |
| | | | | 704/260 |
| 2002/0156807 A1 * | 10/2002 | Dieberger | | G06F 3/016 |
| | | | | 715/247 |
| 2002/0177986 A1 * | 11/2002 | Moeckel | | G06F 17/5018 |
| | | | | 703/9 |
| 2004/0055447 A1 * | 3/2004 | Childs, Jr. | | G06Q 40/00 |
| | | | | 84/615 |
| 2004/0133500 A1 * | 7/2004 | Thompson | | G06Q 10/087 |
| | | | | 705/37 |
| 2004/0220799 A1 * | 11/2004 | Peeters | | G10H 3/125 |
| | | | | 704/205 |
| 2004/0243016 A1 * | 12/2004 | Sanderson | | A61B 5/0836 |
| | | | | 600/532 |
| 2005/0055267 A1 * | 3/2005 | Chasanoff | | G06Q 40/04 |
| | | | | 84/609 |
| 2006/0224888 A1 * | 10/2006 | Mansz | | H04L 63/168 |
| | | | | 713/168 |
| 2006/0247995 A1 * | 11/2006 | Childs, Jr. | | G06Q 40/00 |
| | | | | 705/35 |
| 2007/0270667 A1 * | 11/2007 | Coppi | | A61B 5/222 |
| | | | | 600/300 |
| 2007/0291958 A1 * | 12/2007 | Jehan | | G06N 99/005 |
| | | | | 381/103 |
| 2008/0046246 A1 * | 2/2008 | Goldstein | | H04S 1/005 |
| | | | | 704/258 |
| 2008/0269633 A1 * | 10/2008 | Watson | | A61B 5/048 |
| | | | | 600/544 |
| 2009/0013254 A1 * | 1/2009 | Walker | | G06F 3/0482 |
| | | | | 715/727 |

* cited by examiner

MULTI-CHANNEL DATA SONIFICATION EMPLOYING DATA-MODULATED SOUND TIMBRE CLASSES

CROSS-REFERENCE TO RELATED APPLICATIONS

This application is a continuation of U.S. application Ser. No. 14/176,000, filed Feb. 7, 2014, which is a continuation of U.S. application Ser. No. 13/846,843, filed Mar. 18, 2013, now U.S. Pat. No. 8,692,100, issued Apr. 8, 2014, which is a continuation of U.S. application Ser. No. 13/450,350, filed Apr. 18, 2012, now U.S. Pat. No. 8,440,902, issued May 14, 2013, which is a continuation of U.S. application Ser. No. 12/817,196, filed Jun. 17, 2010, now U.S. Pat. No. 8,247,677, issued Aug. 21, 2012, the disclosures of each of which are incorporated herein in their entireties by reference.

BACKGROUND OF THE INVENTION

Field of the Invention

The present invention generally relates to data sonification and in particular to sound rendering allowing for multiple simultaneous channels of information-carrying utilizing at least the timbre of one or more parameterized audio waveforms.

Background of the Invention

Sonification is the use of non-speech audio to convey information or perceptualize data. Due to the specifics of auditory perception, such as temporal and pressure resolution, sonification offers an interesting alternative or complement to visualization techniques, gaining importance in various disciplines. Sonification has been well established for a long time already as Auditory Display in situations that require a constant awareness of some information (e.g. vital body functions during an operation).

Many analytic tool outcomes produce data that lend themselves well to helpful visualizations (in geographic, spatial formats, and abstract formats). In highly cluttered visual displays, advanced data sonification can be used to convey yet additional data without further encumbering the visual field.

However, sonification systems have long remained far too primitive or inappropriate for general data sets, visualization environments, GIS applications, etc. Accordingly, despite much interest and ongoing intuitive promise, data sonification has remained a novelty area and the use of sonification as a method for exploration of data and scientific modeling is an ongoing topic of low-level research.

Nonetheless, work has demonstrated that sonification can be an extremely powerful tool is if data is expressed in terms of parameterized timbre variations coupled with systematic sonic design. With proper sonic design (not unlike proper visual design) rich powerful multichannel data representations are possible wherein several channels of data values can be simultaneously conveyed effectively.

So empowered, data sonification takes on the same types of support needs and multi-parameter handling that would be afforded sophisticated data visualization systems. As a result, data sonification can take a peer role with data visualization and accordingly the two can share many if not all of the same data preprocessing operations and environments.

Thus the present invention is directed to parameterized timbre variations, audio signal and sonic design, broader sonification environments, interactions with visualization environments, and other related aspects important to making data sonification the viable and powerful tool it could be.

SUMMARY OF THE INVENTION

The invention integrates data sonification tools to provide practical, useful sonification representations for data that would otherwise clutter visually busy or crowded graphical GIS displays. Although always seeming to hold interesting promise, sonification to date is often not very useful or practical. The invention provides for use of a family of signal synthesis, control, and metaphor techniques and technologies for examining environmental, science, business and engineering datasets.

The invention comprises "multi-channel sonification" using data-modulated sound timbre classes set in a spatial metaphor stereo sound field. The sound field can be rendered by inexpensive 2D speaker and 2D/3D headphone audio, resulting in an arrangement providing a richer spatial-metaphor sonification environment.

The invention includes deeply integrated data sonification of data from various models, tools, and data sets, and provides sonification of analysis output data as well as selected measurement data. In one application of the invention, sonification will be rendered either in a GIS display context or in an abstract data set context, as appropriate. Further, sonification can be used to support interactive adjustments of analysis tools.

The user can navigate a listening point within a data sonification.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

DETAILED DESCRIPTION

In the following detailed description, reference is made to the accompanying drawing figures which form a part hereof, and which show by way of illustration specific embodiments of the invention. It is to be understood by those of ordinary skill in this technological field that other embodiments can be utilized, and structural, electrical, as well as procedural changes can be made without departing from the scope of the present invention. Wherever possible, the same element reference numbers will be used throughout the drawings to refer to the same or similar parts.

Computer-generated data visualization has been actively used to study complex data for decades. Data visualization uses parameterize visual primitives, spatial geometry, time, and other elements to convey numerical or logical data to a user. In the mid 1980's data visualization, particularly as used in scientific computing, became extremely sophisticated. Remnants of this are manifest in medical imaging system, instrument control consoles, Geographic Information Systems (GIS), and more recently in newly emergent applications for representing business data (for example employing BIRT).

Data sonification has an interesting but not so successful history. As described earlier, the present invention reopens the possibilities for data sonification with controlled sound rendering approaches allowing for multiple simultaneous channels of information-carrying utilizing at least the timbre of one or more parameterized audio waveforms.

Before delving into the details of the latter, attention is first directed to a framework construction that sets aside many historic notions of and approaches to data sonification (for example, using piano tones of various pitches to sound out stock and bond market data, computer-event alerts, etc.) and instead treats data sonification as a peer to data visualization.

Comparing Data Visualization and Data Sonification

Figure 1:
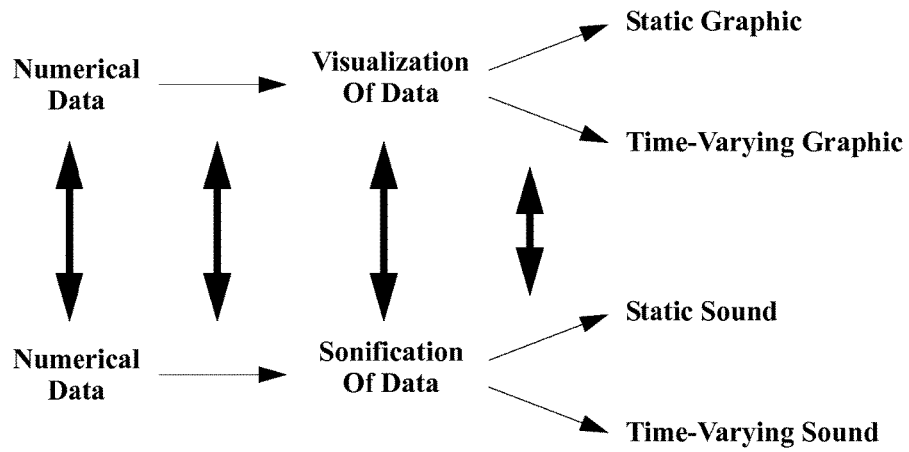
FIG. 1 depicts a comparison between representing numerical data via visualization and sonification.

FIG. 1 depicts a comparison between representing numerical data via visualization and sonification. All that assumed here is that visualization and sonification both are able to carry representations of numerical data within them. In the case of visualization, a visual representation of numerical data can take the form of a static graphic or take the form of a graphic that varies in time (i.e., an animation, or an interactive graphic arrangement). Similarly, in the case of sonification, an auditory representation of numerical data can take the form of a static sound or take the form of a sound that varies in time (i.e., a winking sound, or interactive sound arrangement as with dialing a touchtone phone or playing a music instrument).

Figure 2A:
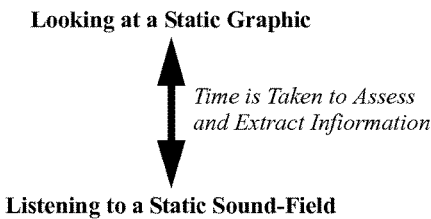
FIG. 2a depicts a representative temporal assessment equivalence between looking at a static graphic and listening to a static sound field.

In listening to a sound that carries information, time must be taken to ascertain the sound's characteristics and what they are configured to convey. However, this is equally true for looking at graphic that carries information: hereto time must be taken to ascertain the graphic's characteristics and what they are configured to convey. FIG. 2 depicts this temporal assessment equivalence between looking at a static graphic and listening to a static sound, or more generally, a sound field as may be created by stereo speakers.

Figure 2B:
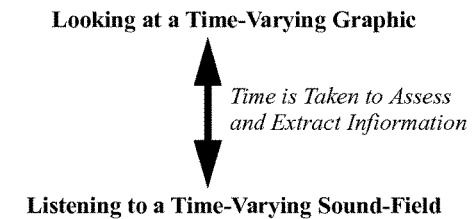
FIG. 2b depicts a representative temporal assessment equivalence between looking at a time-varying graphic and listening to a time-varying sound field.

Similarly, FIG. 2b depicts a representative temporal assessment equivalence between looking at a time-varying graphic and listening to a time-varying sound field. Hereto, both experiences require time to ascertain characteristics and what they are configured to convey. In these time-varying cases, the time-varying characteristic can be at least for a time repetitive—implying a symbolic meaning or having a repetitive structure with discernable attributes that can be parameterized—or can vary with time according to underlying timescales inherent within the numerical data, artificial timescales assigned within the numerical data—or can vary with time according user operation of a user interface in an interactive data exploration, simulation, etc.

Figure 3:
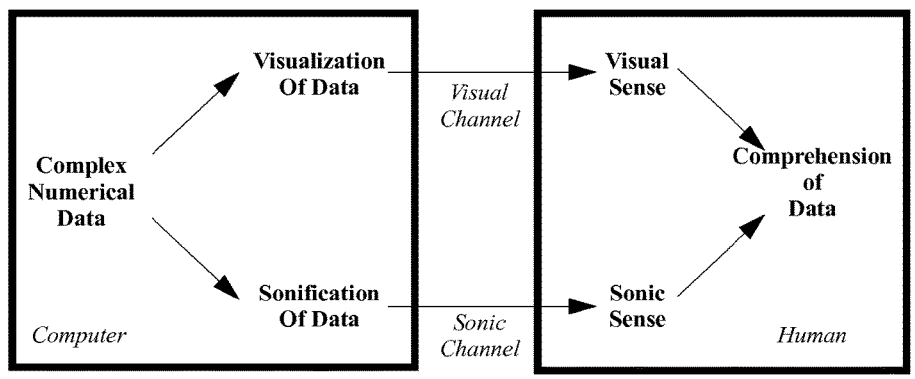
FIG. 3 depicts then how data visualization and data sonification can provide parallel channels in representing complex data resident in a computer to a human attempting to comprehend it.

FIG. 3 depicts then how data visualization and data sonification can provide parallel channels in representing complex numerical data resident in a computer to a human attempting to comprehend that complex numerical data. Of importance in the figure are the visual channel and sonic channel as these have information-carrying capacities, ranges, imposed distortions, and other limitations. These limitations are well-known for visual representations of data—orange text on blue background is hard to see, sensitivity to blue is far less than sensitivity to red, images can get overly crowded, too many things changing at once can be hard to follow, changes can only happen so fast or so slow without becoming imperceptible, etc. There are similar types of limitations for auditory representations of data. Some of these are well-established and widely agreed upon, such as the lower and higher frequency range of pitch perception, masking effects, phantom fundamental pitches, minimum event separate time before separate sonic events are perceived as a single event, beat-frequency effects if two tones are nearly yet not exactly "in tune" with one another, etc. Other limitations are known in more specialized settings, for example the sonic designs used in popular music recordings to avoid "clutter" and "muddiness," and yet other limitations that are not yet well-established or necessarily widely agreed upon have come to appear important in the creation and design of the present invention.

Figure 4A:
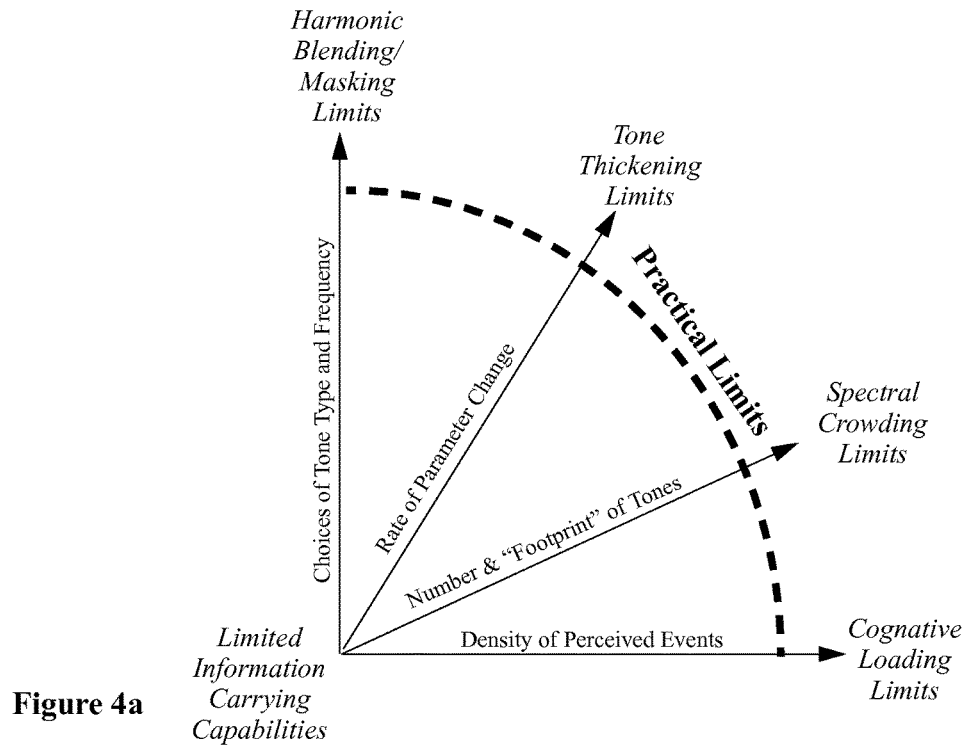
FIG. 4a provides a representational view of four example issues that lead to the need for careful sonic design so as to effectively carry multiple channels of information simultaneously.

FIG. 4a provides a representational view of four example issues that lead to the need for careful sonic design so as to effectively carry multiple channels of information simultaneously. This view is not intended to be precise and in fact if portrayed properly would require a hyper-surface in a four-dimensional space. The salient points are:

In situations with a plurality of tones are simultaneously sounding, improper choice of tone type and frequency (or ranges over which frequencies can vary) can create harmonic blending/masking effects. Fewer simultaneously sounding tones can be used to simplify this dimension of concern, but this limits the information carrying capability of the sound or sound field.

In situations where the underlying data rapidly changes, or where the rate of a periodic modulation is itself used as a vehicle for carrying information, increasing the rate of parameter change "thickens" the tone, which in the limit can increase sonic clutter (as well as serving as an element of contrast)

As more tones with bigger footprints are sounded simultaneously, spectral crowding begins to occur making it more difficult to discern attributes of any one particular sound.

As the density of perceived events (wide-swings, rapid change, etc. in tone attributes) increases, cognitive loading limitations begin to create confusion.

Figure 4B:
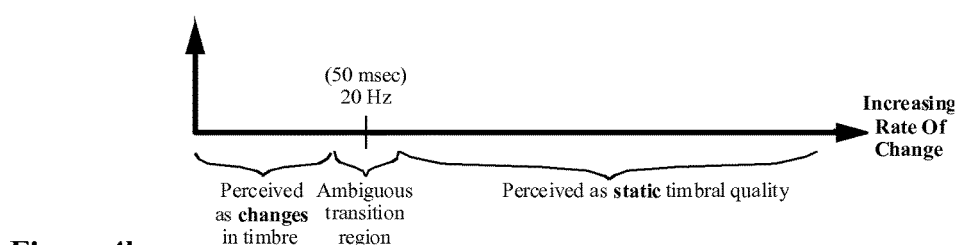
FIG. 4b depicts how temporal variation of timbre, pitch, and amplitude attributes at rates notably less than 50 msec/20 Hz are perceived as a change in these attributes, while temporal variation of timbre, pitch, and amplitude attributes at rates notably more than 50 msec/20 Hz are perceived as quality of timbre of the tone.

More specifically as to the last item, FIG. 4b depicts how temporal variation of timbre, pitch, and amplitude attributes at rates notably less than 50 msec/20 Hz are perceived as a change in these attributes, while temporal variation of timbre, pitch, and amplitude attributes at rates notably more than 50 msec/20 Hz are perceived as quality of timbre of the tone.

There are other examples, some equally important as those cited here. However non-ideal and intermingled these may seem, there are comparable limitations in the visual channel. However, well-defined rules and metrics have been devised long ago to avoid visual channel overloading, distortion, etc., and these well-defined rules and metrics are commonly accepted in the practice of fine-art, graphic arts, photography, and other fields including data visualization. In a similar manner, well-defined rules and metrics can be assembled, devised, and refined to facilitate useful multi-channel data sonification. Several aspects of the present invention relate to this in one way or another as will be seen.

Although data sonification can be used by itself, data sonification can also be used in conjunction with data visualization. Referring again to FIG. 3, the two parallel channels in fact over a number of possible uses, including:

Using sonification to offload information carrying capacity from the visual channel to the sonic channel. Such an approach can be used, for example, in Geographic Information Systems (GIS) where the visual channel is typically quite crowded. This can be useful, for example, when adding additional data presentation loads to a GIS system, as may be useful for environmental study and monitoring, etc.

Using data sonification and data visualization to reinforce each other by providing affirming redundancy Using data sonification and data visualization to search for correlations in complex data—for example several varying quantities can be portrayed in time-varying graphics and several other quantities can be portrayed in time-varying sound, an correlations between sonic and visual events or trends can be identified—in many cases with a moderately large number of varying quantities, searching for correlation only with a visual representation or only within a sonic representation would be considerable more difficult.

Figure 5:
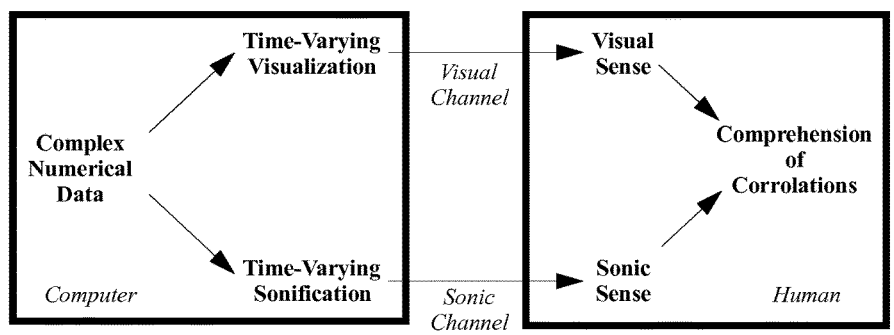
FIG. 5 depicts how the parallel channels of data visualization and data sonification can be used in representing complex numerical data resident in a computer to a human attempting to find correlations within the complex numerical data.

In accordance with the above and other possibilities and opportunities, FIG. 5 depicts how the parallel channels of data visualization and data sonification can be used in representing complex numerical data resident in a computer to a human attempting to find correlations within the complex numerical data.

Information Carrying Vehicles for Data Sonification

Attention is now directed toward modulating parameterized periodic waveforms with low bandwidth signals (most of the spectral energy below the lowest pitch that can be heard). First to be considered is pulse width modulation, and in particular the creating of pulse width modulated waveforms from various source periodic waveforms.

Figure 6:
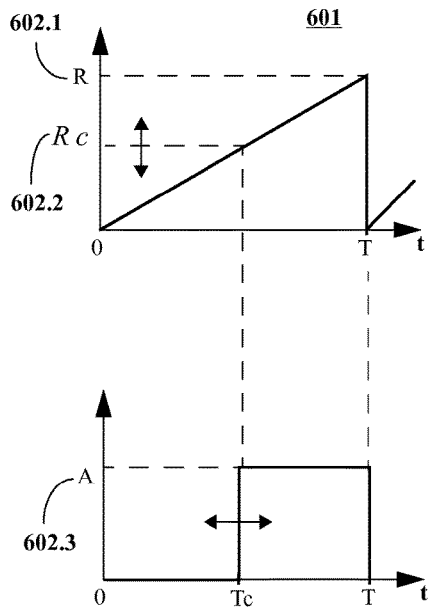
FIG. 6 depicts exemplary generation of a pulse waveform from a threshold comparison of an adjustable threshold value with the amplitude of a periodic ascending ramp waveform.

FIG. 6 depicts generation of a pulse waveform generated from a threshold comparison of an adjustable threshold value with the amplitude of a periodic ascending ramp waveform (often referred to as a "sawtooth" or "saw" waveform). A technique using a right-anchored periodic pulse of controllable width, $PulseR_c(t)$ is used. Again the waveform may be an electrical quantity, non-electrical media quantity, or quantity associated with higher-level signal attributes. Here the periodic up-going ramp waveform typically exhibits a linearly increase from a value of zero to a value of R 602.1. The reference signal at a particular instant may be set at a value equal to a proportion Rc 602.2 of this, $0 \le c \le 1$. Presenting these waveforms to an appropriate comparator implementation whose output values are $A_{max}=0$ and $A_{max}=A$ 602.3 results in the depicted pulse, here $PulseR_c$(t) having value of 0 for the first 100c % of each period, and the value of A for the remaining 100(1−c) % of each period. As the reference signal Rc is raised (c approaches 1 or Rc approaches R), the region of the pulse wave with the amplitude of 0 gets wider, and the region of the pulse wave with the amplitude $A_{max}$ gets narrower. Similarly, as the reference signal Rc is lowered (c approaches 0), the region of the pulse wave with the amplitude of 0 gets narrower, and the region of the pulse with the amplitude $A_{max}$ gets wider.

Figure 7:
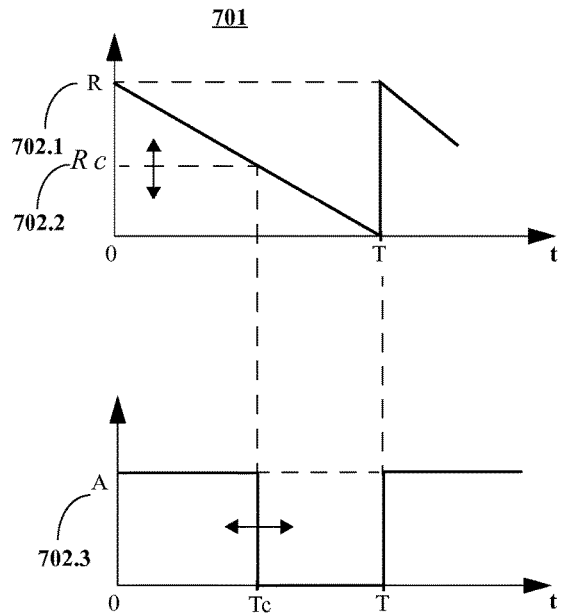
FIG. 7 depicts exemplary generation of a pulse waveform from a threshold comparison of an adjustable threshold value with the amplitude of a periodic descending ramp waveform.

FIG. 7 depicts generation of a pulse waveform generated from a threshold comparison of an adjustable threshold value with the amplitude of a periodic descending ramp waveform. A technique using a left-anchored periodic pulse of controllable width, $PulseL_c(t)$ is used. Again the waveform may be an electrical quantity, non-electrical media quantity, or quantity associated with higher-level signal attributes. Here the periodic down-going ramp waveform typically exhibits a linearly decrease from a value of R 702.1 to a value of zero. The reference signal at a particular instant may be set at a value equal to a proportion Rc 702.2 of this, 0≤c≤1. Presenting these waveforms to an appropriate comparator implementation whose output values are $A_{max}=A$ 702.3 and $A_{min}=0$ results in the depicted pulse, here $PulseL_c$ (t) having value of A for the first 100 c % of each period, and the value of 0 for the remaining 100(1−c) % of each period. As the reference signal Rc is raised (c approaches 1 or Rc approaches R), the region of the pulse wave with the amplitude of $A_{max}$ gets narrower, and the region of the pulse wave with the amplitude 0 gets wider. Similarly, as the reference signal Rc is lowered (c approaches 0), the region of the pulse wave with the amplitude of $A_{max}$ gets wider, and the region of the pulse with the amplitude 0 gets narrower.

Figure 8:
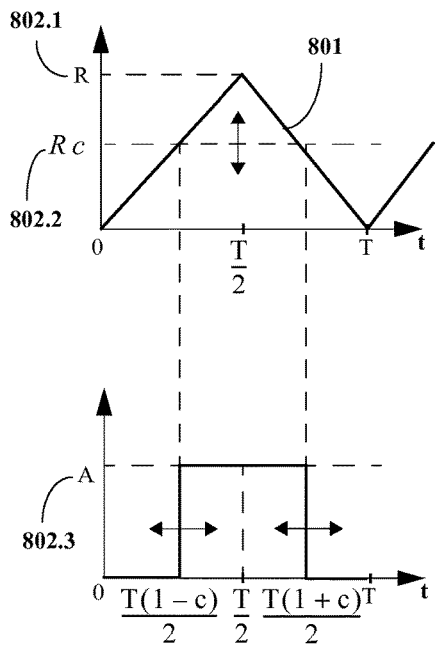
FIG. 8 depicts exemplary generation of a pulse waveform from a threshold comparison of an adjustable threshold value with the amplitude of a periodic triangle waveform.

FIG. 8 depicts generation of a pulse waveform generated from a threshold comparison of an adjustable threshold value with the amplitude of a periodic triangle waveform. Again the waveform may be an electrical quantity, non-electrical media quantity, or quantity associated with higher-level signal attributes. Here the periodic triangle ramp waveform typically exhibits a linearly increase from a value of 0 to a value of R 802.1 then decrease from a value of R 802.1 to a value of zero. The reference signal at a particular instant may be set at a value equal to a proportion Rc 802.2 of this, 0≤c≤1. Presenting these waveforms to an appropriate comparator implementation whose output values are $A_{max}=A$ 802.3 and $A_{min}=0$ results in the depicted pulse, here $PulseL_c$(t) having value of 0 for the first 100T(1−c)/2% of each period, the value of $A_{max}$ from T(1−c)/2 to T(1+c)/2, and the value of 0 for the remaining 100T(1−c)/2% of each period. As the reference signal Rc is raised (c approaches 1 or Rc approaches R), the region of the pulse wave with the amplitude of $A_{max}$ gets narrower, and the regions of the pulse wave with the amplitude 0 on both ends get wider. Similarly, as the reference signal Rc is lowered (c approaches 0), the region of the pulse wave with the amplitude of $A_{max}$ gets wider, and the regions of the pulse with the amplitude 0 on both ends get narrower.

As taught in U.S. patent application Ser. No. 12/144,480 entitled "Variable Pulse-Width Modulation with Zero Constant DC Component in Each Period," the pulse-modulated waveforms of FIGS. 6 and 7 can be shown to be phase-shifted versions of the Pulse-modulated waveform of FIG. 8, wherein the phase shift is proportional to the pulse width. Since frequency is the time-derivative of phase, this means if the pulse width is varied in time, the waveforms of FIGS. 6 and 7 will be frequency-shifted by an amount proportional to the time-derivative of the pulse width variation. This is readily verified experimentally as these frequency shifts are readily discernable to the human ear. This means that the pulse modulation scheme of FIG. 8 gives a cleaner solution: modulations of pulse width will change the timbre but not the pitch, allowing the pitch and the pulse width to be varied as two fully independent, separately discernable information-carrying parameters.

Figure 9:
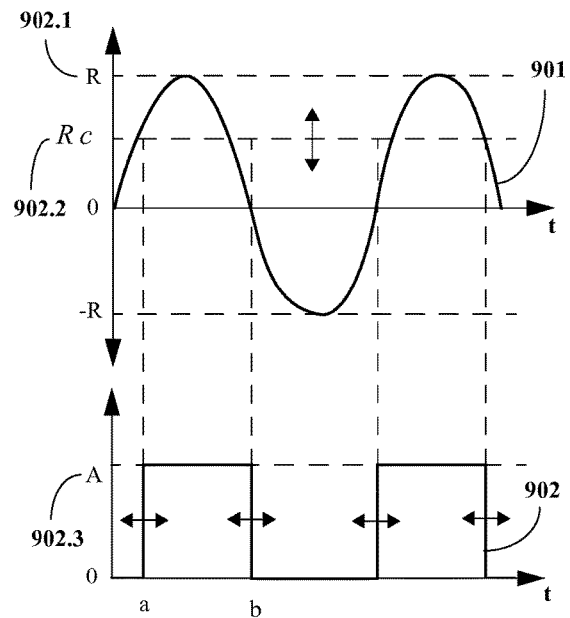
FIG. 9 depicts exemplary generation of a pulse waveform from a threshold comparison of an adjustable threshold value with the amplitude of a periodic sinusoidal waveform.

FIG. 9 depicts generation of a pulse waveform generated from a threshold comparison of an adjustable threshold value with the amplitude of a periodic sinusoidal waveform. Again the waveform may be an electrical quantity, non-electrical media quantity, or quantity associated with higher-level signal attributes. A center-anchored of controllable width, $PulseG_{a,b}$ (t) 902 is generated from the positive portions of a periodic sine waveform 901 with similar comparator arrangements employed as were in the discussions of FIGS. 6 through 8. Here the periodic sine waveform typically oscillates between a value of R 902.1 and a value of −R 902.2. The reference signal at a particular instant may be set at a value equal to a proportion Rc 902.2 of this, 0≤c≤1. Presenting these waveforms to an appropriate comparator implementation whose output values are $A_{max}=A$ 902.3 and $A_{min}=0$ results in the depicted pulse $PulseG_{a,b}$ (t) 902.

In FIG. 9, consider:

$$a = \frac{T}{2\pi}\text{Arcsin}[c]$$

$$b = \frac{T}{2} - \frac{T}{2\pi}\text{Arcsin}[c]$$

The pulse width is:

$$\frac{T}{\pi}\text{Arcsin}[c]$$

and the duty cycle is:

$$\frac{100\%}{\pi}\text{Arcsin}[c]$$

As the reference signal Rc is raised (c approaches 1 or Rc approaches R), the region of the pulse wave with the amplitude of $A_{max}$ gets narrower, and the regions of the pulse wave with the amplitude 0 get wider. Similarly, as the reference signal Rc is lowered (c approaches 0), the region of the pulse wave with the amplitude of $A_{ma}$ gets wider, and the regions of the pulse with the amplitude 0 get narrower. Also, because of the symmetry of the sine wave is similar to that in the triangle wave of FIG. 8, it is readily proven that modulations of pulse width will change the timbre but not the pitch, allowing the pitch and the pulse width to be varied as two fully independent, separately discernable information-carrying parameters.

Should pulse-width modulation be used, it can be advantageous to use zero-DC pulse-width modulation as taught in U.S. patent application Ser. No. 12/144,480 entitled "Variable Pulse-Width Modulation with Zero Constant DC Component in Each Period", particularly if many such pulse waveforms are summed together.

Sonification Sound-Field Audio Rendering

Figure 10:
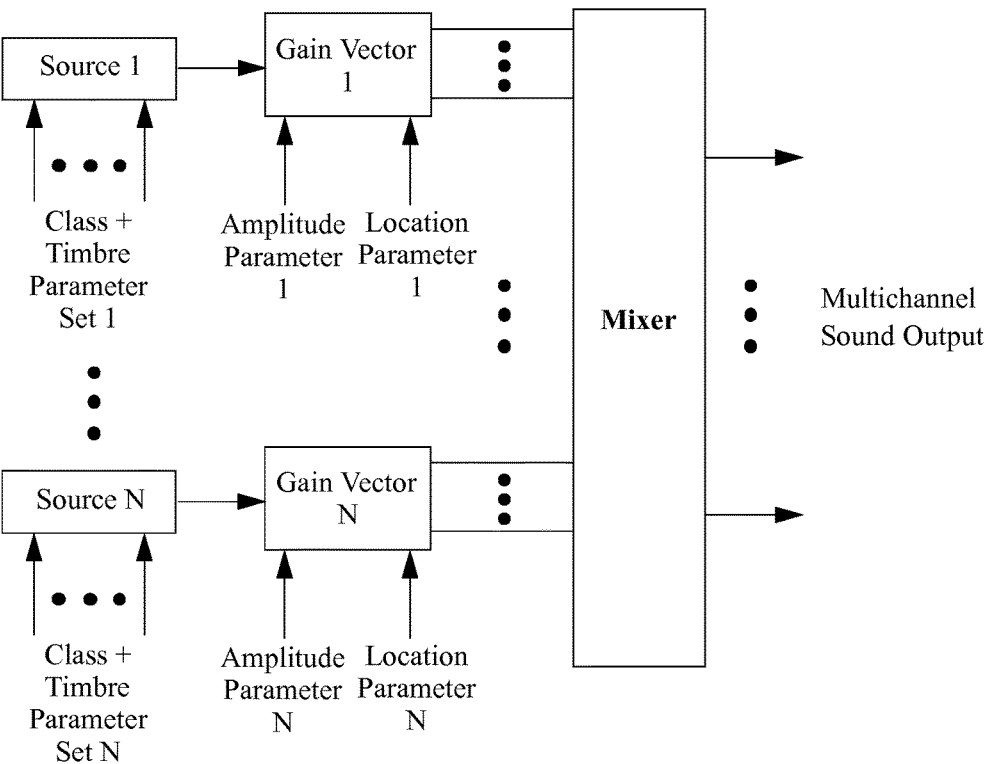
FIG. 10 shows "multichannel sonification" using data-modulated sound timbre classes set in a spatial metaphor stereo sound field.

FIG. 10 shows "multi-channel sonification" using data-modulated sound timbre classes set in a spatial metaphor stereo sound field. The outputs may be stereo, four-speaker, or more complex, for example employing 2D speaker, 2D headphone audio, or 3D headphone audio so as to provide a richer spatial-metaphor sonification environment.

Figure 11:
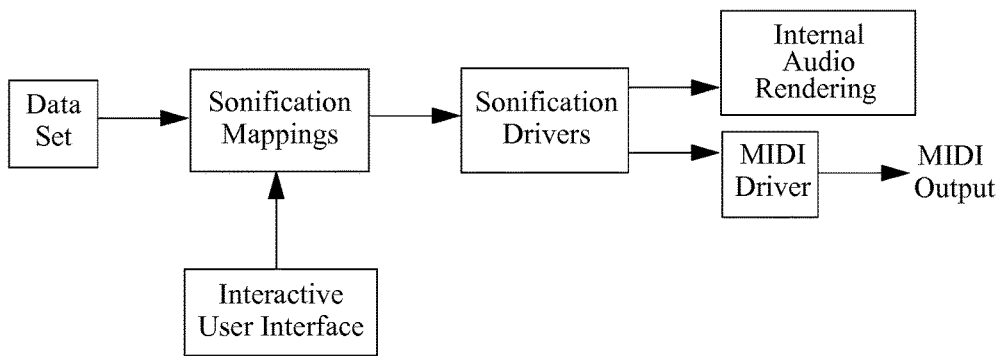
FIG. 11 shows an exemplary embodiment where dataset is provided to sonification mappings controlled by interactive user interface.

FIG. 11 shows an arrangement where dataset is provided to sonification mappings controlled by interactive user interface. Sonification mappings provide information to sonification drivers, which in turn provide information to internal audio rendering and a MIDI driver.

Timbre Spaces and Sonic Design

The timbre of sounds is often mentioned in sonification, but aside from leveraging varieties of timbral qualities of traditional musical instruments, the above work provides little in the way of systemic use of differentiated perception of the timbre of sounds as a tool for sonification in general (and, as discussed later, multi-channel sonification in particular). Notable exceptions to this include [1] based on the notion of Grey's "timbre space" abstraction [2]. Timbre space has been further formalized in a way that characterizes it close to that of a conventional linear vector space, including notions of distance [3-4] and its use as a control structure [5]. This work typically again expresses varieties of timbral qualities in terms of those of traditional musical instruments, although [4] and (with regards to timbre as an abstraction) [6] include and describe the synthesis of sound timbre.

Figure 12:
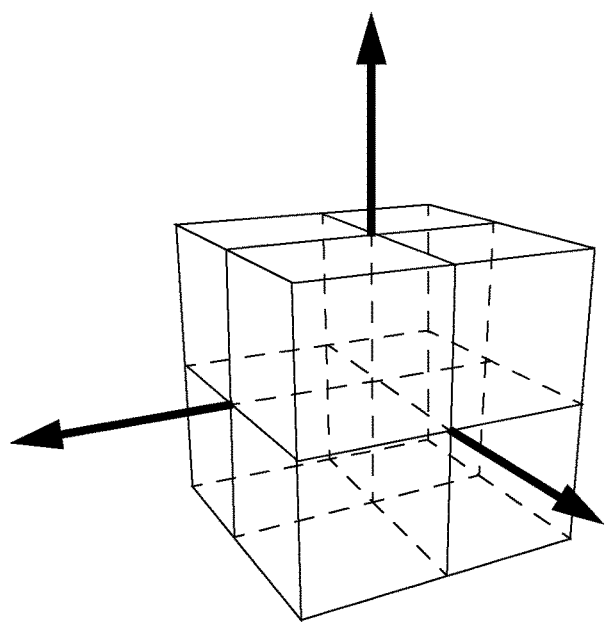
FIG. 12 shows an exemplary embodiment of a three-dimensional partitioned timbre space, allowing the user to sufficiently distinguish separate channels of simultaneously produced sounds, even if the sounds time modulate somewhat within the partition.

FIG. 12 shows an arrangement of a three-dimensional partitioned timbre space. Here the timbre space has three independent perception coordinates, each partitioned into two regions. The partitions allow the user to sufficiently distinguish separate channels of simultaneously produced sounds, even if the sounds time modulate somewhat within the partition as suggested by FIG. 13. Alternatively, timbre spaces may have 1, 2, 4 or more independent perception coordinates.

The features described thus far can readily be extended to clusters of two or more separately perceived sonification tones, each tone carrying its own set of information. FIG. 10 depicts an example multiple perceived parameterized-tone sonification rendering architecture wherein each sound source is specified by sound type ("class") and whose individual timbre may be separately controlled according to variable parameters associated with that sound type. As an example, FIG. 13b shows a recasting of the timbre-space sonification trajectory arrangement depicted in FIG. 13a, but with two separately perceived parameterized-tone sources (i.e., N=2 for FIG. 10), and FIG. 13c shows a case with four separately perceived parameterized-tone sources (i.e., N=4 for FIG. 10).

Other collections of audio signals also occupy well-separated partitions within an associated timbre space. A more sophisticated example of a partitioned timbre space technique also providing a partitioned spectral space is the system and method of U.S. Pat. No. 6,849,795 entitled "Controllable Frequency-Reducing Cross-Product Chain." The harmonic spectral partition of the multiple cross-product outputs do not overlap.

Figure 14:
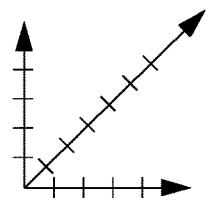
FIG. 14 shows an example of how, through proper sonic design, each timbre space coordinate may support a larger plurality of partition boundaries.

Through proper sonic design, each timbre space coordinate may support several partition boundaries, as suggested in FIG. 12 and FIG. 14. Further, proper sonic design can produce timbre spaces with four or more independent perception coordinates.

Exemplary Pre-Sonification Operations

Attention is now directed to consideration of pre-sonification operations.

Data sonification (and data visualization) can be made far more powerful if one or more mappings of data can be shifted, scaled, or warped with nonlinearities (such as logarithmic, exponential, or power-law functions). Such functionality can be combined with indexing and sorting functions, as well as provisions for updating underlying datasets with new measurements, trial synthesized data, and/or live sensor feeds.

Figure 15:
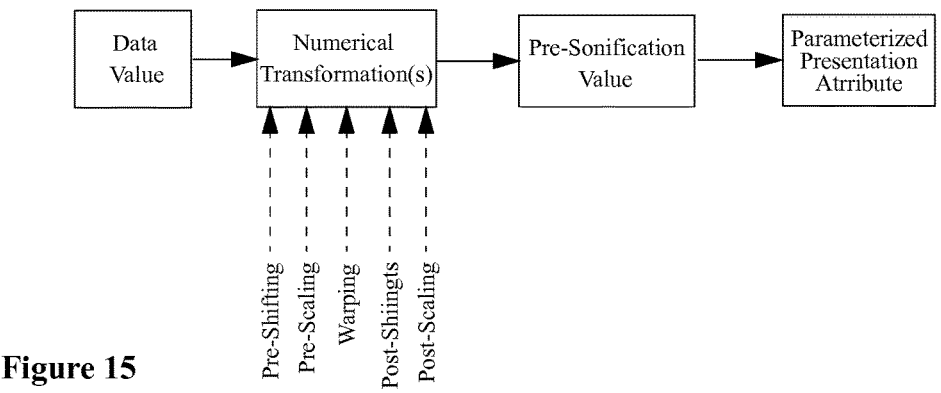
FIG. 15 depicts an exemplary approach for mapping a data value lying within a pre-defined range to a value within a pre-defined range for a parameterized data or cell presentation attribute.

FIG. 15 depicts an approach for mapping a data value lying within a pre-defined range to a value within a pre-defined range for a parameterized data or presentation attribute. In most cases the input data range must be at least scaled and/or shifted so as to match the pre-defined range for a parameterized presentation attribute. In some circumstances it may also be desirable to warp the data range with a nonlinearity. A library of fixed or adjustable nonlinearities can be provided such that the input and output of the nonlinearity both match the pre-defined range for a parameterized presentation attribute. The warping effect is provided with additional flexibility by allowing pre-scaling and/or pre-shifting prior to applying a selected nonlinearity and subjecting the outcome of the nonlinear warping to post-scaling and/or post-shifting operations in order to match the resulting range to the pre-defined range for a parameterized presentation attribute. An example of such arrangements is depicted in FIG. 15.

Figure 16:
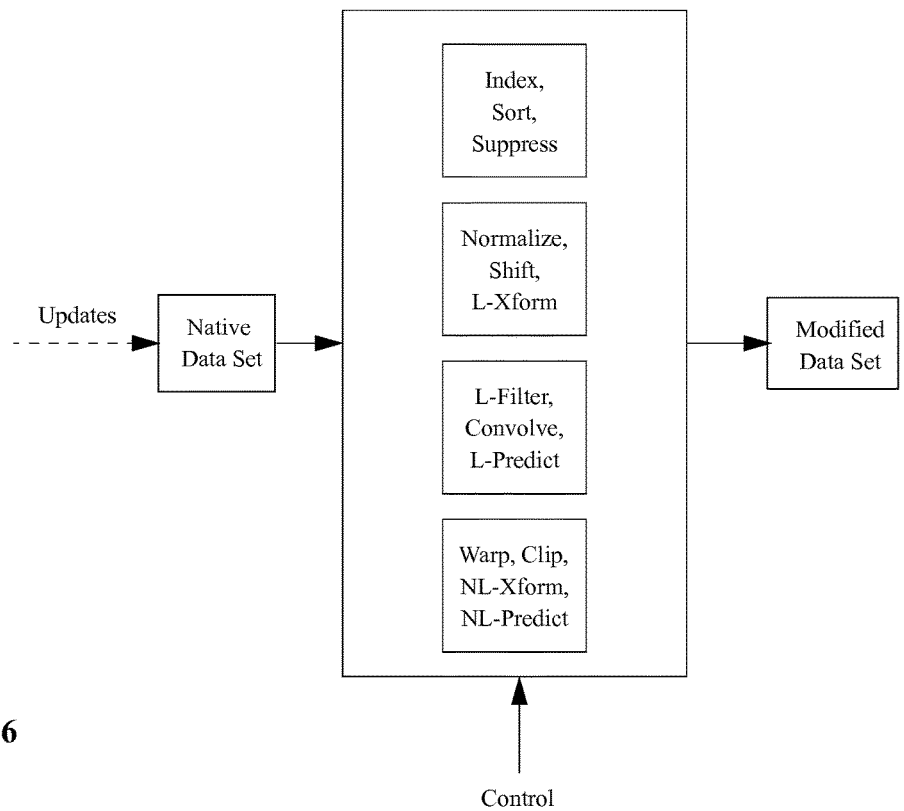
FIG. 16 depicts an exemplary arrangement and general organization of exemplary pre-visualization operations wherein a native data set is presented to normalization, shifting, (nonlinear) warping, and/or other functions, index functions, and sorting functions.

FIG. 16 depicts a more general view and organization of pre-sonification operations provided for by the invention. In this example, available pre-sonification operations include:
  Data indexing/reindexing, data sorting, data suppression, and similar types of data operations;
  Normalization, shifting (translation), and other types of linear and affine transformations;
  Linear filtering, convolution, linear prediction, and other types of signal processing operations;
  Warping, clipping, nonlinear transformations, nonlinear prediction, and other nonlinear transformations.

Two or more of these functions may occur in various orders as may be advantageous or required for an application and produce modified data. Aspects of these functions and/or order of operations may be controlled by a user interface or other source, including an automated data formatting element or an analytic model. The invention further provides that updates are provided to a native data set.

The invention also provides for other types of pre-sonification operations. Statistical operations and statistical processing functions can be used as pre-sonification operations, and for linking to external programs to perform other types of pre-sonification operations. External programs can be added to the collection of available pre-sonification operations.

Figure 17:
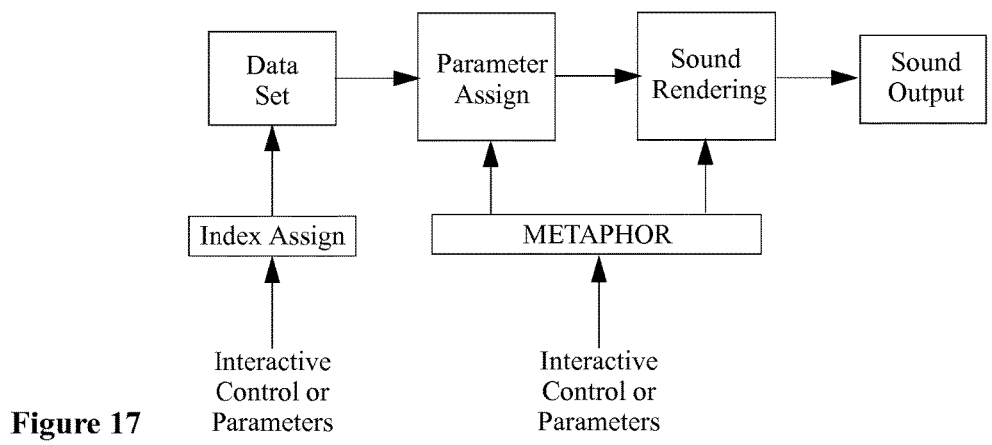
FIG. 17 shows an exemplary arrangement wherein interactive user controls and/or other parameters are used to assign an index to a data set and wherein a selected metaphor is used to automatically generate parameter assignments and graphics rendering operations.

FIG. 17 shows an arrangement wherein interactive user controls and/or other parameters are used to assign an index to a data set. The resultant indexed data set is assigned to one or more parameters as may be useful or required by an application. The resulting indexed parameter information is provided to a sound rendering operation resulting in a sound (audio) output. In some embodiments provided for by the invention, the parameter assignment and/or sound rendering operations may be controlled by interactive control or other parameters. This control may be governed by a metaphor operation useful in the user interface operation or user experience, as described later.

Sonification Time-Index Handling

In some situations, the data in a dataset to be sonified is defined against an intrinsic or inherent time-line. The sonification rendering in some cases may be performed at the natural time scale, at a speeded or slowed time-scale, in real-time, or in artificially controlled time (as with a shuttle wheel control, animation loop, etc.). In other circumstances the time-line may be artificially created from components of the data (for example, time may signify travel in distance, increase in temperature, etc.). Additional variations on these capabilities include the creation and use of artificial trajectories, such as the path through the Belmont urban wetland slough depicted in FIG. 20. Here a user-defined geographic path trajectory can be traversed by a clocked or hand-manipulated travel rate, with location visually signified by a cursor, arrow head, lengthening line, color change, or other means. In response, an example multi-channel sonification may render three data values at any given position of the trajectory traversal (for example direct-measured and/or kriging-interpolated values of salinity, temperature, and turbidity) as three discernible timbre (or other) parameters of what is perceived as a single controllable tone source (as a simple example, employing (1) pulse width modulation depth, (2) pulse width modulation rate, and (3) distuned-dissonance created by additive sinewave difference effects).

Figure 13A:
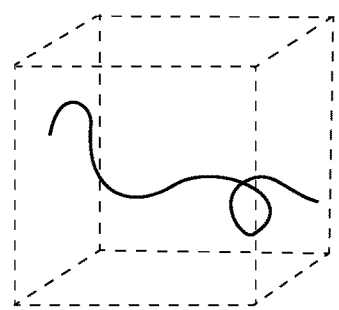
FIGS. 13a-13c shows trajectories through a three dimensional timbre space.
Figure 13B:
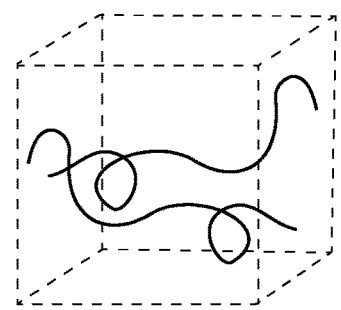
Figure 13C:
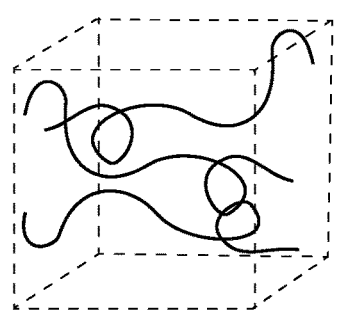
Figure 20:
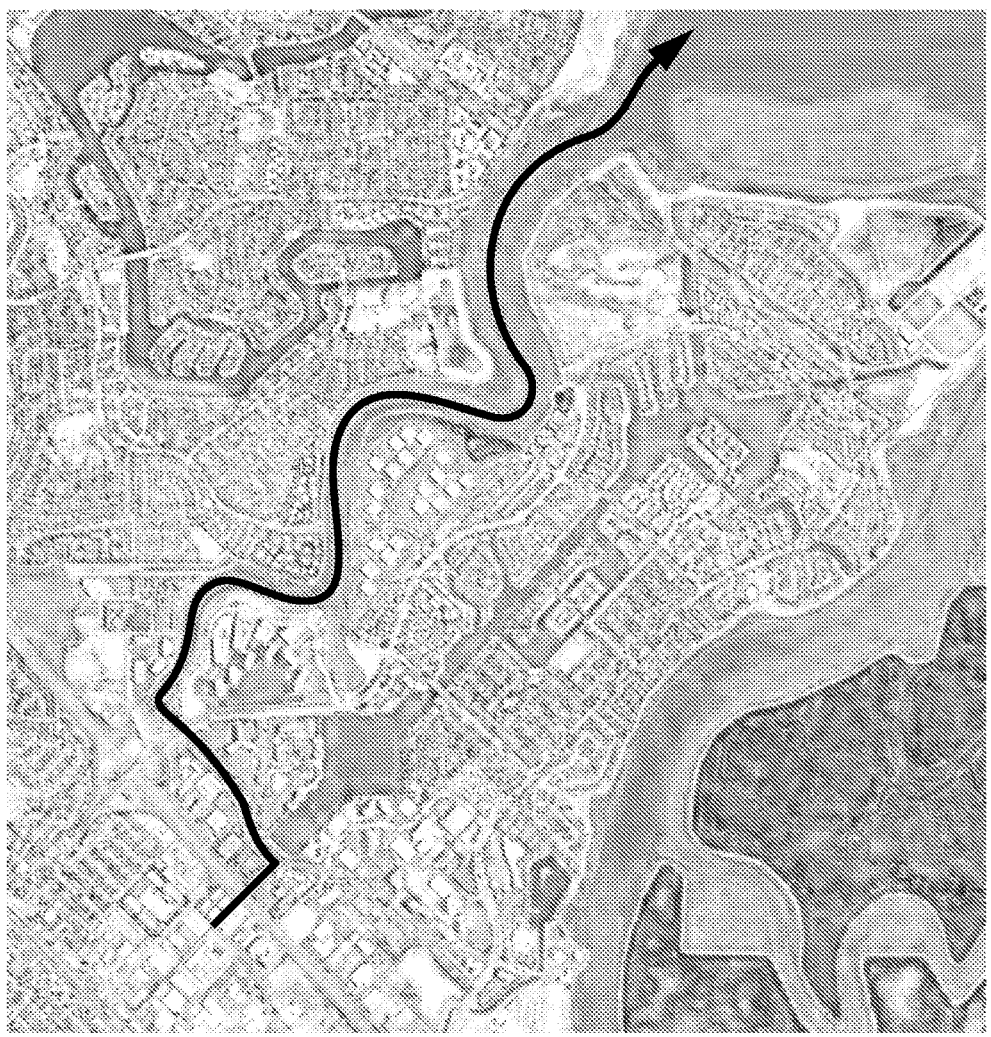
FIG. 20 depicts an exemplary data visualization rendering provided by a GIS system providing an interactive user interface that can be used to operate a data sonification.

A resultant timbre trajectory of these three varying timbral parameters, with movement along the path of this timbre trajectory tracking movement along the path of the user-defined geographic trajectory of FIG. 20, could resemble the trajectory depicted in FIG. 13a.

Rates of change of sound parameters can easily be even more of a concern in multi-channel and multiple-perceived-tone sonification. Due to the intertwined ~20 Hz lowest perceived frequency and ~50 msec time correlation window [64] of auditory perception, temporal variation of timbre, pitch, and amplitude attributes at periods/rates notably less than 50 msec/20 Hz are perceived as a change in these attributes, while temporal variation of timbre, pitch, and amplitude attributes at rates notably more than 50 msec/20 Hz are perceived as quality of timbre of the tone as was illustrated in FIG. 4b. Thus, sonification time-index handling can provide more usable perception experiences if rates of change of tone attribute variations (and to some extent portions of a variation signal's instantaneous harmonic structure as well) are kept below the 50 msec/20 Hz rate. Alternatively, compensation can be provided for faster rates of change; these can be quite sophisticated in form but are analogous to shifting the frequency of each harmonic of a tone reproduced by a moving speaker so as to compensate for the instantaneous Doppler shift resultant from the movement of the speaker.

As an example, the three dimensions of the timbre space may still represent salinity, temperature, and turbidity and each of the (two or four) separate sources represent different water depths or differing transverse locations across the water surface. Although the same three-parameter tone described in conjunction with FIG. 13a may be used (for example at different pitches or different spatial locations in a stereo sound field), in general as more signal sources are added the sonic space becomes more cluttered. Additionally, if pitch is used as the discerning attribute among the multiple instances of the same tone class (type of sound), it is noted that in many circumstances modulation indexes must be adjusted with frequency so as to obtain the same perceived effect.

The invention provides for each of these considerations, as well as far more sophisticated and varied tone classes than the one described in the examples of FIGS. 13a-13c, and in particular for effective mixtures of simultaneously sounding tone classes. For example, it may be advantageous to superimpose one or more completely different sounding tone class(es) for representing other location-dependent attributes, such as (in an environmental GIS system as considered later) calculated integrated run-off drainage volume into the waterway, estimated cross-sectional depth of the waterway, etc. It is noted that the latter two data examples (calculated integrated run-off drainage volume, estimated cross-sectional depth) may not be actual data in the dataset but may be from another dataset or from run-time calculations made from simpler component data in the same or linked dataset.

Use of Metaphors

Accordingly, the invention additionally provides for the inclusion and use of visual metaphors to simplify sonification setup and user interaction for data exploration. As an example, FIG. 17 also depicts an arrangement wherein a selected metaphor is used to automatically generate parameter assignments and graphics rendering operations. The invention provides for metaphors to control other aspects of the sonification and pre-sonification operations, and to base its operations on characteristics of a data set being visualized and/or sonified, previously visualized and/or sonified, and/or anticipated to be visualized and/or sonified. Metaphors are selected and controlled by user interaction, data values, or other means.

Use of Multidimensional User Interfaces

As mentioned above, the invention provides for the support, inclusion, and use of multidimensional user interface devices for providing extra control parameters, 3D-geometry control and metaphors, 6D-geometry control and metaphors, etc. Such multidimensional user interface devices can include a High-Definition Touchpad that taught in U.S. Pat. No. 6,570,078, and U.S. patent application Ser. Nos. 11/761,978 and 12/418,605, advanced computer mice taught in U.S. Pat. No. 7,557,797 and U.S. patent application Ser. No. 10/806,694, video cameras taught in U.S. Pat. No. 6,570,078, or other types of touch, control-based, or visually operated user interfaces. The invention provides for the incorporation of and use of multidimensional user interface devices in interacting with data visualization and/or data sonification environments, either stand alone or in collaborative environments.

Use of Data Flow Paths to Implement Arbitrary Interconnection Topologies

The invention provides for the use of data flow paths to link arbitrary data sources with arbitrary data destinations via arbitrary topologies. This allows the selection and/or fusion of data sources, their interconnection with selected signal processing, statistical processing, pre-sonification operations, and sonification parameters.

Figure 18:
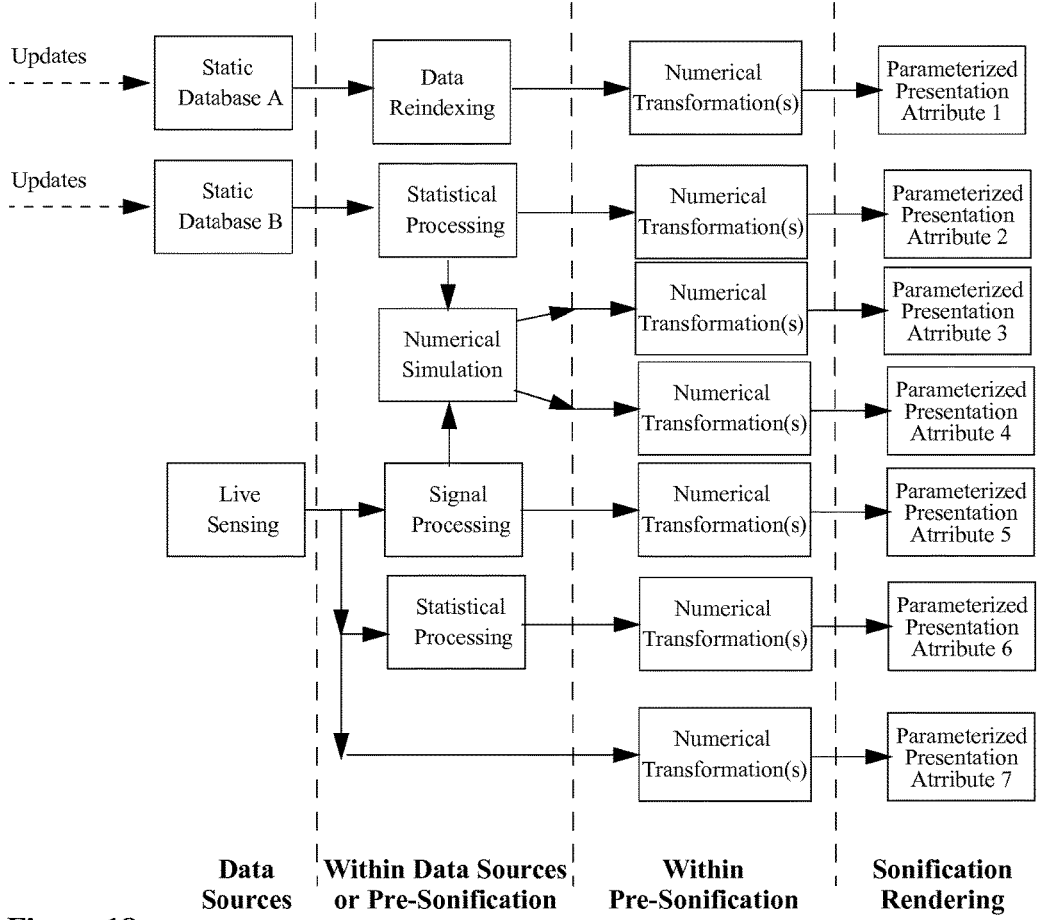
FIG. 18 depicts an exemplary topological interconnection of data flow paths linking various elements.

FIG. 18 depicts an topological interconnection of data flow paths linking various elements that can be relevant in a data sonification environment. Functions such as data reindexing, statistical processing, and signal processing can be used as data sources or as the pre-sonification functions. Similarly, numerical simulations, as may be rendered by a high-performance or other computer, can serve as data sources. Certain pre-sonification functions, for example linear predictors, may in an embodiment be regarded as a numerical simulation.

The invention provides for some or all of the data flow paths (such as a graphical diagrammic depiction of the arrangement of FIG. 18) to be specified in any convenient way, for example graphically via an interactive GUI or via a character-based language (interconnection, specification, and/or data-flow, etc.). A GUI can include the rendering of a graphic similar to that of FIG. 18, or can permit creation and customization of instances of functional blocks such as the ones depicted in FIG. 18 from a library, menu, and/or graphical pallet. A GUI can be used to create and link these customized instances of functional blocks, via link-by-link "drawing," with a data path topology such as the ones depicted in FIG. 18.

Shared Data Sonification and Data Visualization Environments

Figure 19:
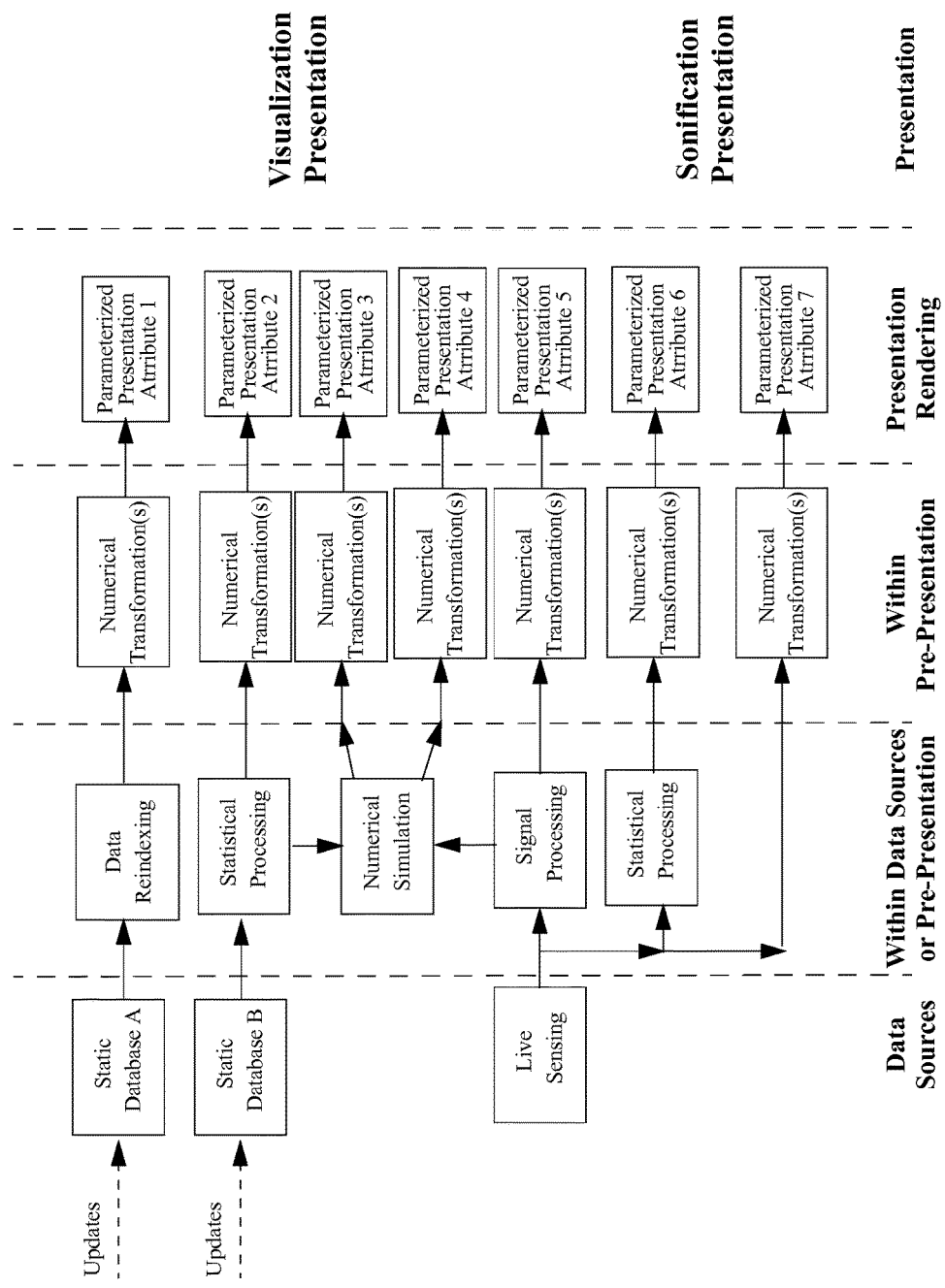
FIG. 19 depicts an exemplary adaptation of the arrangement depicted in FIG. 18 configured to selectively direct individually parameters to be rendered within a visualization, within a sonification, or within both simultaneously

FIG. 19 depicts an adaptation of the arrangement depicted in FIG. 18 configured to selectively direct individually parameters to be rendered within a visualization, within a sonification, or within both simultaneously.

The example in the section to follow shows how this arrangement can be useful in an application.

In situations where there is a natural or artificial timeline, the invention provides for synchronization between data sonification rendering and presentation and the data visualization rendering and presentation.

Use of GIS and Data Visualizations as Interactive User interface for Data Sonification FIG. 20 depicts a data visualization rendering provided by a user interface of a GIS system depicting an aerial or satellite map image for a studying surface water flow path through a complex mixed-use area comprising overlay graphics such as a fixed or animated flow arrow. The system can use data kriging to interpolate among one or more of stored measured data values, real-time incoming data feeds, and simulated data produced by calculations and/or numerical simulations of real world phenomena.

FIG. 20 depicts an flow path that can be provided via a user interface built atop of and in terms of a GIS and/or data visualization. The system can visually plot this data or use it to produce a sonification. Attention is directed to the flow path (curved arrow line) through a visual representation (here, a satellite image) of the environment area under study as shown in FIG. 20 as it would be on a user interface display.

The visual plot or sonification can render representations of one or more data values associated with a selected point selected by a cursor a cursor (shown as a small black box on the curved arrow line) on a flow path (curved arrow line), or as a function of time as a cursor (shown as a small black box on the curved arrow line) moves along the flow path at a specified rate.

The system can visually display this data or use the data to produce a sonification.

The sonification may render sounds according to a selected point on the flow path, or as a function of time as a cursor moves along the flow path at a specified rate. For example, the system can produce a trajectory in sonification parameter (timbre) space such as that depicted in FIG. 12, wherein as a cursor moves along the path in FIG. 20 the corresponding sonification rendered would simultaneously behave as prescribed by the trajectory in sonification parameter (timbre) space depicted in FIG. 12.

An embodiment of the invention can overlay visual plot items or portions of data, geometrically position the display of items or portions of data, and/or use data to produce one or more sonification renderings. For example, a sonification environment may render sounds according to a selected point on the flow path, or as a function of time as a cursor moves along the surface water flow path at a specified rate.

Use of Auditory Perception Eigenfunctions

The invention provides for sonifications employing "auditory perception eigenfunctions" in the production of the data-manipulated sound. As taught in that provisional patent application, these "auditory perception eigenfunctions" are eigenfunctions (within a Hilbert space) for an operator equation defined by three of the most fundamental empirical attributes of human hearing:
  the approximate 20 Hz-20 KHz frequency range of auditory perception [7];
  the approximate 50 msec temporal-correlation window of auditory perception (for example "time constant" in [8];
  the approximate wide-range linearity (modulo post-summing logarithmic amplitude perception, nonlinearity explanations of beat frequencies, etc.) when several signals are superimposed [7,8].

The audio perception eigenfunctions can be related to the integral equation whose eigenfunctions are the Prolate Spheroidal Wave Functions ("PSWFs," also known more recently as "Slepian functions") [9]. The integral equation for the audio eigenfunctions stems from a (typically smoothed) time-domain gate function and a (typically smoothed) frequency-domain bandpass function; in comparison, the integral equation whose eigenfunctions are the PSWFs stems from an (abrupt) time-domain gate function and an (abrupt) frequency-domain lowpass function. As the auditory perception eigenfunctions are, by its very nature, defined by the interplay of time limiting and band-pass phenomena, it is possible the Hilbert space model eigensystem may provide important new information regarding the boundaries of temporal variation and perceived frequency (for example as may occur in rapidly spoken languages, tonal languages, vowel guide [10-12], "auditory roughness" [8], etc.), as well as empirical formulations (such as critical band theory, phantom fundamental, pitch/loudness curves, etc.) [7,8].

While the invention has been described in detail with reference to disclosed embodiments, various modifications within the scope of the invention will be apparent to those of ordinary skill in this technological field. It is to be appreciated that features described with respect to one embodiment typically can be applied to other embodiments. Audio eigenfunctions are taught in the inventor's copending U.S. patent application Ser. No. 12/849,013.

The invention can be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. Therefore, the invention properly is to be construed with reference to the claims.

REFERENCES

[1] Barrass, S.; "A perceptual framework for the auditory display of scientific data," *ACM Transactions on Applied Perception*, Vol. 2 No. 4, October 2005, pp. 389-402.
[2] Grey, J. M., *An exploration of musical timbre*, Ph.D. dissertation, Dept. of Music Report No. STAN-M-2, Stanford University, CA, 1975.
[3] Terasawa, H.; Slaney, M.; Berger, J., "Perceptual Distance in Timbre Space," *ICAD05 Proceedings*, 2005.
[4] Drioli, C.; Polotti.; Delle Monache, S.; Rocchesso, D.; Adiloglu, K.; Annies, R.; Obermayer, K.; "Auditory Representations as Landmarks in the Sound Design Space," *Proc. SMC09*, Porto, July 2009.
[5] Wessel, D., "Timbre Space as a Musical Control Structure," Rapport Ircam 12/78, 1978 http://articles.ircam.fr/textes/Wessel78a/(visited Nov. 27, 2009).
[6] Scaletti, C., "Sound synthesis algorithms for auditory data representations," *Auditory Display: Sonification, Audification, and Auditory Interfaces*. G. Kramer, (Ed.), Santa Fe Institute Studies in the Sciences of Complexity, Proc. Vol. XVIII. Addison-Wesley, Reading, Mass.
[7] Winckel, F., Music, Sound and Sensation: A Modern Exposition, Dover Publications, 1967.
[8] Zwicker, E.; Fastl, H., *Psychoacoustics: Facts and Models, Springer*, 2006.
[9] Slepian, D.; Pollak, H., "Prolate Spheroidal Wave Functions, Fourier Analysis and Uncertainty—I," *The Bell Systems Technical Journal*, pp. 43-63, January 1960.
[10] Rosenthall, S., *Vowel/Glide Alternation in a Theory of Constraint Interaction (Outstanding Dissertations in Linguistics)*, Routledge, 1997.
[11] Zhang, J., *The Effects of Duration and Sonority on Contour Tone Distribution: A Typological Survey and Formal Analysis (Outstanding Dissertations in Linguistics)*, Routledge, 2002.
[12] Rosner, B.; Pickering, J., *Vowel Perception and Production (Oxford Psychology Series)*, Oxford University Press, 1994.

What is claimed is:

1. A data sonification system for representing a plurality of channels of numerical information via a plurality of corresponding discernable variations of timbre of at least one of a plurality of audio-frequency waveforms, the at least one of the plurality of the audio-frequency waveforms being perceivable by a user as comprising a plurality of audio tones having at least one corresponding discernable timbre attribute, the data sonification system comprising:

a plurality of audio-frequency waveform generators, each of the plurality of audio-frequency waveform generators generating an associated one of the plurality of the audio-frequency waveforms, wherein each of the associated ones of the plurality of the audio-frequency waveforms comprises a fixed audio-frequency and at least one adjustable timbre control parameter, each of the at least one of the adjustable timbre control parameter having an associated adjustable value which can be discernibly varied within a timbre space occupied by the plurality of the audio-frequency waveforms; and a mapping element for mapping aspects of multidimensional numerical data with the at least one of the adjustable timbre control parameters of each of the associated ones of the plurality of the audio-frequency waveforms, wherein for the associated ones of the plurality of the audio-frequency waveforms the mapping element adjusts a value of the at least one of the adjustable timbre control parameters responsive to values of the multidimensional numerical data, wherein for the plurality of the audio-frequency waveforms the timbre of the associated ones of the audio-frequency waveform carries information responsive to values of underlying data for presentation to a user, and wherein the associated ones of the plurality of the audio-frequency waveforms and their respective adjustable timbres are arranged to provide a plurality of data-modulated sound timbre classes within the timbre space.

2. The data sonification system of claim 1 wherein the at least one of the plurality of the audio-frequency waveforms comprises a plurality of timbre control parameters, each of the plurality of the timbre control parameters affecting the timbre of the at least one of the plurality of the audio-frequency waveforms; and wherein the mapping element adjusts the value of each of the plurality of the timbre control parameters responsive to values of the multidimensional numerical data.

3. The data sonification system of claim 1, wherein the sound timbre classes can be arranged to convey a sonic metaphor.

4. The data sonification system of claim 1, wherein the values of the multidimensional numerical data are sequentially selected by the user from the multidimensional numerical data, the values sequentially selected over an interval of time.

5. The data sonification system of claim 1, wherein the values of the multidimensional numerical data are sequentially selected according to a trajectory selected through a subset of the multidimensional numerical data.

6. The data sonification system of claim 1, wherein the values of the multidimensional numerical data are sequentially selected responsive to a position on a trajectory specified by the user through a subset of the multidimensional numerical data, the trajectory rendered in a data visualization.

7. The data sonification system of claim 1, wherein the values of the multidimensional numerical data are sequentially selected responsive to a position of a cursor within a rendered data visualization.

8. The data sonification system of claim 1, wherein the multidimensional numerical data is retrieved from storage.

9. The data sonification system of claim 1, wherein the multidimensional numerical data is provided by a live real-time data stream.

10. The data sonification system of claim 1, wherein the multidimensional numerical data is created from live sensor data.

11. The data sonification system of claim 1, wherein the mapping comprises pre-sonification operations involving the imposing of indexing on selected data.

12. The data sonification system of claim 1, wherein the mapping comprises pre-sonification operations involving data suppression.

13. The data sonification system of claim 1, wherein the mapping comprises pre-sonification operations involving data value normalization.

14. The data sonification system of claim 1, wherein the mapping comprises pre-sonification operations involving linear transformations.

15. The data sonification system of claim 1, wherein the mapping comprises pre-sonification operations involving affine transformations.

16. The data sonification system of claim 1, wherein the mapping comprises pre-sonification signal processing filtering operations on selected data.

17. The data sonification system of claim 1, wherein the mapping comprises pre-sonification operations involving nonlinear transformations.

18. The data sonification system of claim 1, wherein the mapping comprises pre-sonification operations involving linear predictor operations.

19. The data sonification system of claim 1, wherein the at least one timbre control parameter controls a width of a pulse waveform.

20. The data sonification system of claim 1, wherein at least one of the plurality of the audio-frequency waveforms comprises a plurality of the adjustable timbre control parameters, each of the plurality of the adjustable timbre control parameter affecting the timbre of the audio-frequency waveform; and wherein the mapping adjusts the value of each of the plurality of the adjustable timbre control parameters responsive to the values of the multidimensional numerical data.

* * * * *